United States Patent
Phillips

(10) Patent No.: US 7,790,266 B2
(45) Date of Patent: Sep. 7, 2010

(54) REBOUNDABLE OPTICAL STRUCTURE

(75) Inventor: Edward D. Phillips, Oakville, CT (US)

(73) Assignee: Reflexite Corporation, Avon, CT (US)

(*) Notice: Subject to any disclaimer, the term of this patent is extended or adjusted under 35 U.S.C. 154(b) by 0 days.

(21) Appl. No.: 12/152,388

(22) Filed: May 14, 2008

(65) Prior Publication Data

US 2008/0220217 A1  Sep. 11, 2008

Related U.S. Application Data

(63) Continuation of application No. 10/012,053, filed on Nov. 5, 2001, now abandoned.

(60) Provisional application No. 60/247,573, filed on Nov. 9, 2000.

(51) Int. Cl.
| | |
|---|---|
| B32B 3/00 | (2006.01) |
| B32B 3/12 | (2006.01) |
| B32B 3/26 | (2006.01) |
| B32B 27/40 | (2006.01) |
| D06N 7/04 | (2006.01) |
| G02B 5/122 | (2006.01) |
| G02B 5/124 | (2006.01) |

(52) U.S. Cl. ............ 428/172; 428/156; 428/147; 428/159; 428/160; 428/423.1; 428/423.7; 428/157; 428/141; 359/529; 359/530

(58) Field of Classification Search ......... 428/156, 428/157, 159, 160, 172, 167, 141, 337, 423.1, 428/423.7, 147; 359/529, 530
See application file for complete search history.

(56) References Cited

U.S. PATENT DOCUMENTS

| | | | |
|---|---|---|---|
| 3,458,348 A | 7/1969 | Sherman | |
| 3,689,346 A | 9/1972 | Rowland | |
| 4,420,527 A | 12/1983 | Conley | |
| 4,576,850 A | 3/1986 | Martens | |
| 4,668,558 A | 5/1987 | Barber | |
| 4,713,433 A | 12/1987 | Renzi et al. | |
| 5,015,524 A | 5/1991 | Kobayashi et al. | |
| 5,117,304 A | 5/1992 | Huang et al. | |
| 5,175,030 A | 12/1992 | Lu et al. | |
| 5,190,807 A | 3/1993 | Kimock et al. | |
| 5,212,596 A | 5/1993 | Andrus | |
| 5,254,390 A | 10/1993 | Lu | |
| 5,578,693 A | 11/1996 | Hagstrom et al. | |
| 5,635,278 A | 6/1997 | Williams | |

(Continued)

FOREIGN PATENT DOCUMENTS

JP  55-16098  2/1980

(Continued)

Primary Examiner—David R Sample
Assistant Examiner—Catherine Simone
(74) Attorney, Agent, or Firm—Nixon Peabody LLP

(57) ABSTRACT

A reboundable optical structure includes a base layer; and an optical element layer formed with a reboundable polymeric material and attached to the base layer. The optical structure can include a diffuser, fresnel lens, linear prism film, collimating film, lenticular elements, and retroreflective structures. A method for forming a reboundable optical structure includes providing a base layer; and attaching an optical element layer formed with a reboundable polymeric material and attached to the base layer, thereby forming an optical structure.

14 Claims, 1 Drawing Sheet

U.S. PATENT DOCUMENTS

| | | |
|---|---|---|
| 5,642,222 A | 6/1997 | Phillips |
| 5,670,096 A | 9/1997 | Lu |
| 5,714,218 A | 2/1998 | Nishio et al. |
| 5,916,669 A | 6/1999 | Parker et al. |

FOREIGN PATENT DOCUMENTS

| | | |
|---|---|---|
| JP | 02-240602 | 9/1990 |
| JP | 03-077284 | 3/1991 |
| JP | 03-135501 | 6/1991 |
| JP | 04-288314 | 10/1992 |
| JP | 05-295574 | 11/1993 |
| JP | 07-146401 | 6/1995 |
| JP | 06-203050 | 2/1996 |
| JP | 08-048744 | 2/1996 |
| JP | 09-242038 | 8/1997 |
| JP | 10-163365 | 6/1998 |
| JP | 11-038204 | 2/1999 |
| JP | 11-060658 | 3/1999 |
| JP | 11-349645 | 12/1999 |
| JP | 02-105149 | 4/2002 |
| WO | WO 96/26184 | 8/1996 |
| WO | WO 00/11095 | 3/2000 |
| WO | WO 00/20481 | 4/2000 |
| WO | WO 02/29448 | 4/2002 |

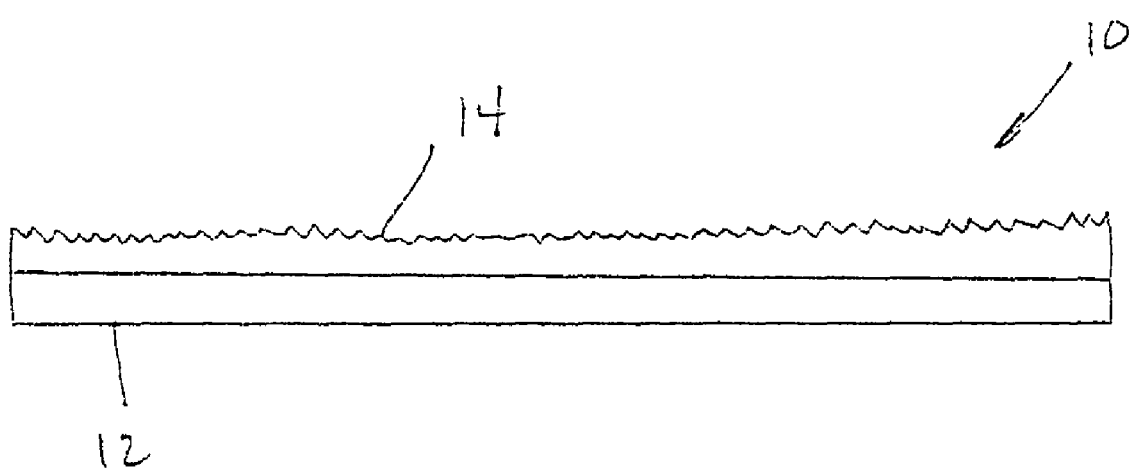

REBOUNDABLE OPTICAL STRUCTURE

RELATED APPLICATION(S)

This application is a continuation of U.S. application Ser. No. 10/012,053, filed on Nov. 5, 2001, now abandoned which claims the benefit of U.S. Provisional Application No. 60/247,573, filed on Nov. 9, 2000. The entire teachings of the above applications are incorporated herein by reference.

BACKGROUND OF THE INVENTION

Light diffusing films are currently widely used in many optical, lighting, and display applications. Many of the most efficient diffusers utilize engineered microstructures to effectively distribute the light in a desired manner. Most of these diffusing films are formed by either molding or casting a polymer against a mold surface having relief structures present to produce the appropriate structure on the film surface. These structures are usually made of non-elastomeric polymeric materials, such as polyacrylates, polystyrenes, polycarbonates and polyolefins.

A problem arises when the required diffusing microstructures are of a shape that it becomes fragile and thereby easily damaged by routine handling of the film in assembly processes. Minor surface rubs can result in permanent, visible scratches and abrasions on the diffusing film rendering it useless for many applications or at least cosmetically. Therefore, a need exists for an improved light diffusing film.

SUMMARY OF THE INVENTION

A reboundable optical structure includes a base layer; and an optical element layer formed with a reboundable polymeric material and attached to the base layer. The optical structure can include a diffuser, fresnel lens, linear prism film, collimating film, lenticular elements, and retroreflective structures. A method for forming a reboundable optical structure includes providing a base layer; and attaching an optical element layer formed with a reboundable polymeric material and attached to the base layer, thereby forming an optical structure.

The present invention can be used in diffusing films, fresnel lenses, collimating films, linear optical structures, etc. The present invention has the advantage of good optical performance while being resistant to scratches and abrasions, which can occur from handling. For example, a fingernail scraped across a diffuser having optical microstructures formed from an acrylic resin and sized on the order of between about two and about ten micrometers can be permanently scarred by an edge of a piece of paper or a fingernail. To the contrary, the present invention after a similar type of injury to the microstructure can essentially recover to its original configuration over a period of minutes or hours. Another advantage of the present invention is that the reboundable polymer is effective in deterring unauthorized replication of the optical structure. A counterfeit mold of an optical structure can be made from an impression of the optical structure and then electroformed to provide an adequate but not a high quality mold. This type of copying, which occurs with knock-off manufacturers, can be done on a hard substrate, such as an acrylic polymer. The optical structure formed with the reboundable polymer is sufficiently pliable to foil sufficient quality replication.

BRIEF DESCRIPTION OF THE DRAWINGS

The FIGURE shows a reboundable light diffusing film.

The foregoing and other objects, features and advantages of the invention will be apparent from the following more particular description of preferred embodiments of the invention, as illustrated in the accompanying drawing in which like reference characters refer to the same parts throughout the different views. The drawing is not necessarily to scale, emphasis instead being placed upon illustrating the principles of the invention. All percentages and parts are by weight unless otherwise indicated.

DETAILED DESCRIPTION OF THE INVENTION

The present invention includes casting or molding a microstructured surface onto a desirable sheeting material utilizing an elastomeric polymer. One embodiment of this invention employs a high efficiency radiation curable casting process by utilizing a reactive casting polymer that can derive its elastomeric nature from a multi-functional terminally unsaturated urethane oligomer. The polymer is the reaction product of a terminally unsaturated isocyanate containing polyurethane oligomer with an alkoxylated polyhydric alcohol. The polyurethane oligomer typically forms in the range of between about fifty and about ninety percent by weight of the reboundable structure. Reboundable is considered the ability of the structure to spring or bounce back after hitting or contacting with an object and retain within a short time thereafter substantially to the same configuration as before the contact and can continue to maintain the functionality of the structure.

Suitable optical structures include diffusion screens, fresnel lenses, linear prism films, collimating films, lenticular elements, and retroreflective structures that are known in the art. Diffusion screens can be used in rear projection screens. Diffusion screens include bulk diffusers either tinted or untinted, tinted bulk diffusers with lenticular lenses, glass-beaded screens and tinted surface relief diffusers. As shown in the FIGURE, the optical structure 10 can include a base layer 12 that can be a thin film. The base layer 12 can have a thickness in the range of between about 12.5 and about 1,500 micrometers. The thin film is formed of a polyester, polycarbonate, polyacrylate, polystyrene or other suitable support film material or combination thereof. The thin film can be tinted or optically clear with dyes or pigments as known in the art. The optical element layer 14 is attached to base layer 10. The optical element layer 14 can have linear prisms, lenticular prisms or other suitable elements for redirecting light. The optical element layer 14 is formed of a reboundable material, such as a polyurethane that is of optical quality having a continuity of an index of refraction. The polymer is not grainy and is of consistent and homogeneous structure. In one embodiment, the optical element layer has a thickness in the range of between about 0.15 and about 150 micrometers.

An example of a process to form the reboundable polymer is described in U.S. Pat. No. 5,578,693, issued to Hagstrom et al. on Nov. 26, 1996, the teachings of which are incorporated by reference herein. By use of this oligomer along with a high functionality modifying monomer, preferably having a relatively compact structure, the properties of the resulting polymer can be modified to alter the balance between elasticity and rigidity to give necessary recovery characteristics for a given application. In one embodiment, the modifying monomer forms in the range of between about one and about twenty-five percent by weight of the reboundable polymer. In a preferred embodiment, the range is between about three and about ten percent. Examples of modifying monomers include di-trimethylolpropane tetraacrylate, dipentaerythritol pentaacrylate or their alkoxylated analogs.

Adhesion can be achieved by established conventional methods, such as corona discharge treatment of the substrate or by use of an adhesion enhancing intermediate coating previously applied to the film substrate. Adhesion characteristics of this oligomer to the desired substrate can be adjusted through selection of (preferably monofunctional) reactive diluents. For example, acrylates and methacylates are suitable diluents. Examples of monomers that are suitable as diluents include tetrahydrofurfuryl (meth)acrylate; 2-phenoxyethyl (meth)acrylate; isobornyl (meth)acrylate; 1,6-hexanediol di(meth)acrylate or their alkoxylated analogs. The diluent monomers can have a concentration in the range of between about zero and about fifty percent. In one embodiment, the diluent monomer has a concentration of about ten percent.

The compound can include other components as desired. Examples of such components include a photoinitiator having a concentration in the range of between about two and about eight percent, a hindered amine light stabilizer having a concentration of about three percent or less. An example of a suitable amine is bis-(1,2,2,6,6-tetramethyl-4-piperidinyl) sebacate. A suitable amount of hindered amine is in a range of between about zero and about three percent. Other components include ultraviolet absorbers, such as a benzophenone or benzotriazole-type compound, which can greatly improve colorfastness and stability. An example of a suitable ultraviolet absorber is 2-(2'-hydroxy-3'-5'-di-tert-amylphenyl)benzotriazole. Also colorants can be added to provide a gray tint or other desired effect.

In a preferred embodiment, a multi-functional terminally unsaturated urethane oligomer includes the reaction product of (a) a terminally unsaturated isocyanate-containing polyurethane oligomer with (b) an alkoxylated polyhydric alcohol. The oligomer achieves dramatic viscosity decreases with higher functionality oligomers by incorporating alkoxylated polyhydric alcohols as the functionality modifier into the reaction stoichiometry of the capped urethane oligomer.

A process for producing these multi-functional terminally unsaturated urethane oligomers includes the steps of: (1) reacting at least one diisocyanate with at least one polyol to form an isocyanate-terminated prepolymer; (2) reacting a portion of the unreacted terminal isocyanate groups with at least one hydroxyl-functional acrylate or hydroxyl-functional vinyl ether to form a terminally unsaturated isocyanate-containing urethane oligomer; and (3) reacting the remaining terminal isocyanate groups with at least one alkoxylated polyhydric alcohol.

A radiation-curable formulation includes a multi-functional terminally unsaturated urethane oligomer comprising the reaction product of (a) a terminally unsaturated isocyanate-containing polyurethane with (b) and alkoxylated polyhydric alcohol; and a reactive monomer.

The term "terminally unsaturated isocyanate-containing urethane oligomer" as employed herein refers to any polyurethane compound that contains an unsaturated terminal groups and also contains isocyanate groups. The unsaturated terminal groups are preferably formed from hydroxyl-functional acrylates and hydroxyl-functional vinyl ethers. Commercially available species of these preferred classes of capped urethane oligomers are available and are also known as acrylated polyurethanes and vinyl ether polyurethanes, respectively. These terminally unsaturated isocyanate-containing polyurethanes are made by reacting a polyisocyanate with a polyol and a hydroxyl-functional compound having an unsaturated group (e.g. hydroxylacrylate or hydroxyvinyl ether). The reaction of these three species can be sequential or simultaneous as is conventionally employed.

In a preferred embodiment, the polyisocyanate is a diisocyanate. Suitable diisocyanates include methylene bis(phenyl isocyanate) (also known as MDI) 2,4-toluene diisocyanate (2,4-TDI); a 80:20 mixture of 2,4- and 2,6-toluene diisocyanate (also known as TDI); 3,-isocyanatomethyl-3,5,5-trimethyl cyclohexylisocyanate (IPDI); m-tetramethyl xylene diisocyanate (TMXDI); hexamethylene diisocyanate (HDI); and methylene bis(cyclohexyl isocyanate) (sold as Desmodur W).

The polyol employed can be any polyether polyol or polyester polyol. Examples of polyether polyols include poly (propylene oxide) diols, copoly(ethylene oxide-propylene oxide) diols, and poly(tetramethylene oxide) diols. Examples of suitable polyester polyols preferably include any well known di-, tri-, or tetrahydroxy-terminated polyesters, such as polylactone polyesters and polyester polyols produced by the polycondensation reactions of dicarboxylic acids or their anhydrides with di-, tri-, or tetra-alcohols.

The term "hydroxyl-functional acrylate" means any hydroxyl-substituted acrylate or methacrylate compound that would be suitable for making and using a capped urethane oligomer. Examples of such compounds include 2-hydroxyethyl acrylate, 2-hydroxypropyl acrylate, 2-hydroxyethyl methacrylate, pentaerythritol triacrylate (PETA), and 4-hydroxybutyl acrylate.

The term "hydroxyl-functional vinyl ether" means any hydroxyl-substituted vinyl ether that would be suitable for making and using a capped urethane oligomer. Examples include ethylene glycol monovinyl ether, and cyclohexane dimethanol monovinyl ether.

The multi-functionality modifiers can be a nominal six mole ethoxylate of trimethylolpropane available as MACOL RD 306EM from PPG Industries, and a nominal twelve mole propoxylate of sorbitol available as THANOL LS 490 from Eastman Chemical Co. Again, these are used for illustrative purposes, and any alkoxylated polyhydric alcohol with a functionality greater than two would be considered acceptable for use.

Molecular weight depends upon particular polyols, polyisocyanates and their ratio and the particular multi-functional modifier. Generally, the number average molecular weight of the multi-functional terminally unsaturated urethane oligomers can be in the range of between about 1,500 and about 10,000 not considering chain extension.

One preferred embodiment relates to a capped urethane oligomer comprising the combination of: (a) at least one diisocyanate with an equivalent weight between about 80 and about 200; (b) at least one polyol with an equivalent weight between about 100 and about 2,000; (c) at least one hydroxyacrylate or hydroxy vinyl ether; and (d) at least one alkoxylated polyhydric alcohol with an equivalent weight between about 32 and about 200.

This preferred embodiment is based upon improved oligomer performance by raising the functionality of the capped urethane oligomers to greater than two functional but less than six functional with accompanying decreases in viscosity compared to the described traditional approaches. The approach has further advantages in that any mixture of isocyanate, hydroxyacrylate or hydroxyvinyl ether, and polyol can be used to achieve final properties of the curable material. The polyurethane oligomer viscosity can be minimized by using alkoxylated polyhydric alcohols in adjusting reaction stoichiometry.

By separating the functional modifier (i.e., polyhydric alcohol such as TMP or Sorbitol) from the closest urethane groups by alkoxy units (e.g., EO or PO groups) and increasing the functionality of the modifying alkoxylated poly-hydric alcohol to greater than two, a dramatic decrease in oligomer viscosity can be realized compared to similar TMP or sorbitol products without the EO or PO groups, without adversely affecting the other properties. Also, by increasing the functionality of the modifier, the urethane content of the polyhydric molecule is also increased (e.g. substituting sorbitol for TMP, for example, increases the number of urethane groups in the above-described oligomers to about twenty-four).

The multi-functional, terminally unsaturated urethane oligomers can be cured via free radical forming thermal curative, such as with a peroxide, or alternatively radiation curable according to conventional method of radiation curing including the use of ultraviolet light and electron beam energy. Generally, these multi-functional terminally unsaturated urethane oligomers can be used alone or as the principal component of the radiation curable composition, along with other components such as reactive monomers, crosslinkers and photoinitiators. Preferably, the concentration of these multi-functional terminally unsaturated urethane oligomers is in the range of between about twenty and about one hundred weight percent, more preferably in the range of between about fifty and about one hundred weight percent of the radiation curable composition.

Reactive monomers, also known as reactive solvents can also be present in these radiation curable composition. Generally, any reactive monomer which is suitable for conventional radiation curable composition can be used with the multi-functional terminally unsaturated urethane oligomers. The preferred class of reactive solvents are acrylates or methacrylates. The concentration of reactive monomers in the radiation curable composition can be in the range of between about zero and about forty weight percent, more preferably in the range of between about zero and about twenty weight percent. The radiation curable composition can also contain conventional crosslinking agents and photoinitiators. The concentration of each of these classes of ingredients can preferably be in the range of between about zero and about thirty weight percent, based on the total weight of the radiation curable composition.

The radiation curable composition can also contain small amounts of conventional additives much as pigments, wetting agents, and the like, which are employed in the usual known effective concentrations.

The radiation curable composition can be produced by conventional methods by mixing the selected components together. The composition can be applied to the substrate by conventional means, including spray, curtain, dip pad, rollcoating and brushing procedures. The composition can be applied to any acceptable substrate such as glass, plastic, and the like. In a preferred embodiment, the composition can be applied to a thin film formed of polyester, polycarbonate, polyacrylate, etc. and then the composition is cast in a mold as the film and composition are pressure nipped.

The applied radiation curable composition can be cured by any of the known actinic radiation curing methods, such as exposure to ultraviolet light, x-rays, alpha particles, electron beam, or gamma rays. Irradiation can be performed using any of the known and commonly available types of radiation curing equipment, for example, curing can be done by low, medium, or high pressure mercury arc lamps. Curing can be carried out in air or in an inert atmosphere, such as nitrogen or argon. Exposure time required to cure the composition varies somewhat depending on the specific formulation, type and wavelength of radiation, energy flux, and film thickness. Those skilled in the art of radiation technology will be able to determine the proper curing time for any particular composition. Generally, the cure time is rather short, that is, less than about a minute. In one embodiment, the ultraviolet curable radiation can be about 157-236 watts/cm (400-600 watts/inch) using a medium pressure ultraviolet light source.

While this invention has been particularly shown and described with references to preferred embodiments thereof, it will be understood by those skilled in the art that various changes in form and details may be made therein without departing from the scope of the invention encompassed by the appended claims.

What is claimed is:

1. A reboundable optical structure comprising:
   a) a base layer; and
   b) an optical element layer attached to the base layer, said optical element layer having a microstructured surface resistant to scratches and abrasions by substantially recovering its original configuration and functionality over a period of minutes or hours, and wherein the optical element layer comprises from about 50% to about 90% by weight of a multi-functional terminally unsaturated urethane oligomer, wherein said urethane oligomer is the reaction product of (i) a terminally unsaturated isocyanate-containing polyurethane oligomer with
   (ii) an alkoxylated polyhydric alcohol;
   (iii) from about 1% to about 25% by weight of a modifying monomer selected from one or more di-trimethylolpropane tetraacrylate, dipentaerythritol pentaacrylate and their alkoxylated analogs; and
   (iv) from about 0% to about 50% by weight of a reactive diluent.

2. The reboundable optical structure of claim 1 wherein said optical structure is selected from a group consisting of a diffuser, Fresnel lens, linear prism film, retroreflective elements, lenticular elements, and collimating film.

3. The reboundable optical structure of claim 1 wherein said base layer includes a polymer selected from a polyester, polycarbonate, polyacrylate and polyolefin or combination thereof.

4. The reboundable optical structure of claim 1, wherein said optical element layer includes a diluent selected from a group consisting of monomers that include tetrahydrofurfuryl (meth)acrylate; 2-phenoxyethyl (meth)acrylate; isobornyl (meth)acrylate; 1,6-hexanediol di(meth)acrylate and their alkoxylated analogs.

5. The reboundable optical structure of claim 1, wherein said optical element layer includes acrylates and methacylates.

6. The reboundable optical structure of claim 1, wherein said optical element layer has a thickness in the range of between about 0.15 and about 150 micrometers.

7. The reboundable optical structure of claim 1 further including an adhesive coating located between the base layer and the optical element layer.

8. The reboundable optical structure of claim 1, wherein the optical element layer further comprises a photoinitiator.

9. The reboundable optical structure of claim 1, wherein the optical element layer further comprises a hindered amine light stabilizer.

10. The reboundable optical structure of claim 1, wherein the optical element layer further comprises an ultraviolet absorber.

11. The reboundable optical structure of claim 1, wherein the terminally unsaturated isocyanate-containing polyurethane oligomer is the product of reacting a polyisocyanate with a polyol and a hydroxyl-functional compound having an unsaturated group.

12. The reboundable optical structure of claim 11, wherein the polyisocyanate is a diisocyanate.

13. The reboundable optical structure of claim 12, wherein the diisocyanate is 3-isocyanatomethyl-3,5,5-trimethyl cyclohexylisocyanate (IPDI), hexamethylene diisocyanate (HDI), or methylene bis(cyclohexyl isocyanate).

14. The reboundable optical structure of claim 1, wherein the weight % of the modifying monomer is from about 3% to about 10%.

* * * * *